US012623160B2

(12) United States Patent
Goldenberg et al.

(10) Patent No.: US 12,623,160 B2
(45) Date of Patent: May 12, 2026

(54) CLOSED LOOP FEEDBACK ATMOSPHERIC EFFECTS SYSTEMS

(71) Applicant: Sphere Entertainment Group, LLC, New York, NY (US)

(72) Inventors: Jason Goldenberg, Las Vegas, NV (US); Michael Rives, Orlando, FL (US); Stuart Elby, Westport, CT (US); Robert Anderson, Levittown, NY (US)

(73) Assignee: Sphere Entertainment Group, LLC, New York, NY (US)

( * ) Notice: Subject to any disclaimer, the term of this patent is extended or adjusted under 35 U.S.C. 154(b) by 343 days.

(21) Appl. No.: 18/121,786

(22) Filed: Mar. 15, 2023

(65) Prior Publication Data

US 2024/0307794 A1 Sep. 19, 2024

(51) Int. Cl.
*G05B 19/00* (2006.01)
*A63J 5/02* (2006.01)
(Continued)

(52) U.S. Cl.
CPC ................. *A63J 5/02* (2013.01); *F24F 11/64* (2018.01); *F24F 11/89* (2018.01); *G05B 19/042* (2013.01);
(Continued)

(58) Field of Classification Search
CPC .. A63J 5/02; A63J 2005/006; A63J 2005/007; A63J 2005/008; A63J 5/025;
(Continued)

(56) References Cited

U.S. PATENT DOCUMENTS

| | | | |
|---|---|---|---|
| 4,023,645 A | 5/1977 | Retka et al. | |
| 4,199,936 A | 4/1980 | Cowan et al. | |

(Continued)

FOREIGN PATENT DOCUMENTS

| | | |
|---|---|---|
| WO | WO 2017105058 A1 | 6/2017 |
| WO | WO 2019/121744 A1 | 6/2019 |
| WO | WO 2020053514 A1 | 3/2020 |

OTHER PUBLICATIONS

International Search Report and Written Opinion of the International Searching authority directed to related International Application No. PCT/US2024/018647, mailed Jun. 10; 9 pages.
(Continued)

*Primary Examiner* — Aleksey Olshannikov

(74) *Attorney, Agent, or Firm* — Sterne, Kessler, Goldstein & Fox P.L.L.C.

(57) ABSTRACT

Systems, methods, and apparatuses disclosed herein can be implemented as a closed loop feedback system to provide various atmospheric effects. These systems, methods, and apparatuses can regulate these atmospheric effects based on one or more environmental measurements as part of the closed loop feedback system. As part of the closed loop feedback system, these systems, methods, and apparatuses can detect, or measure, one or more physical properties, such as temperature, atmospheric pressure, humidity, wind speed, wind direction, precipitation amount, scent, location, altitude, and/or azimuth to provide some examples. These systems, methods, and apparatuses can compare the one or more physical properties with one or more performance targets of the atmospheric effects and can regulate the atmospheric effects to cause the one or more physical properties to satisfy the one or more performance targets of the atmospheric effects.

23 Claims, 7 Drawing Sheets

(51) Int. Cl.

| | |
|---|---|
| *F24F 11/64* | (2018.01) |
| *F24F 11/89* | (2018.01) |
| *G05B 19/042* | (2006.01) |
| *A63J 5/00* | (2006.01) |

(52) U.S. Cl.
CPC .... *A63J 2005/006* (2013.01); *A63J 2005/007* (2013.01); *A63J 2005/008* (2013.01); *F24F 2221/08* (2013.01); *G05B 2219/2614* (2013.01)

(58) Field of Classification Search
CPC ........ A63J 5/028; A63J 5/00; A63J 2005/005; F24F 11/64; F24F 11/89; F24F 2221/08; G05B 19/042; G05B 2219/2614
See application file for complete search history.

(56) References Cited

U.S. PATENT DOCUMENTS

| | | | |
|---|---|---|---|
| 4,370,155 | A | 1/1983 | Armbruster |
| 5,832,320 | A | 11/1998 | Wittek |
| 6,220,388 | B1 | 4/2001 | Sanborn |
| 7,691,002 | B2 | 4/2010 | Casey et al. |
| 8,336,261 | B2 | 12/2012 | Hosking et al. |
| 9,307,841 | B2 | 4/2016 | Jamele et al. |
| 11,260,314 | B1 | 3/2022 | Anderson et al. |
| 11,266,921 | B1 | 3/2022 | Anderson et al. |
| 11,434,826 | B2 | 9/2022 | Riou et al. |
| 11,986,849 | B2 | 5/2024 | Anderson et al. |
| 12,017,152 | B2 | 6/2024 | Anderson et al. |
| 2005/0284692 | A1 | 12/2005 | McWilliam et al. |
| 2007/0119433 | A1 | 5/2007 | Popik et al. |
| 2009/0014237 | A1 | 1/2009 | Skowronski et al. |
| 2011/0319180 | A1 | 12/2011 | Lee |
| 2012/0131858 | A1 | 5/2012 | Hosking et al. |
| 2015/0198150 | A1 | 7/2015 | Streeter |
| 2015/0345497 | A1 | 12/2015 | Lucas et al. |
| 2017/0072674 | A1 | 3/2017 | Butler et al. |
| 2017/0074288 | A1 | 3/2017 | Venugopal Setty et al. |
| 2017/0131858 | A1 | 5/2017 | Gu |
| 2017/0191684 | A1 | 7/2017 | Tompkins |
| 2017/0306845 | A1 | 10/2017 | Laing et al. |
| 2018/0030896 | A1 | 2/2018 | Roach et al. |
| 2020/0224810 | A1 | 7/2020 | Hakuta et al. |
| 2021/0093742 | A1 | 4/2021 | Miki |
| 2021/0293210 | A1 | 9/2021 | Timme |
| 2022/0054952 | A1 | 2/2022 | Anderson et al. |
| 2022/0054953 | A1 | 2/2022 | Anderson et al. |
| 2022/0176265 | A1 | 6/2022 | Anderson et al. |
| 2022/0228605 | A1 | 7/2022 | Anderson et al. |
| 2024/0167714 | A1* | 5/2024 | McKenna ................ F24F 11/63 |
| 2024/0183293 | A1 | 6/2024 | Anderson et al. |
| 2024/0286059 | A1 | 8/2024 | Anderson et al. |

OTHER PUBLICATIONS

International Search Report and Written Opinion of the International Searching authority directed to related International Application No. PCT/US2024/044180, mailed Nov. 21, 2024; 11 pages.

Extended European Search Report directed to related European Application No. 22740152.8, mailed Dec. 2, 2024; 9 pages.

International Search Report and Written Opinion of the International Searching Authority directed to related International Application No. PCT/US2021/046479, mailed Sep. 21, 2021; 7 pages.

International Search Report and Written Opinion of the International Searching authority directed to related International Application No. PCT/US22/12543, mailed Apr. 4, 2022; 14 pages.

* cited by examiner

202 — CONFIGURE ATMOSPHERIC EFFECTS PODS TO PROVIDE ATMOSPHERIC EFFECTS AT SPECIFIC PERFORMANCE TARGETS

204 — ACCESS ENVIRONMENTAL MEASUREMENTS THAT INDICATE PHYSICAL PROPERTIES WITHIN THE VENUE

206 — COMPARE THE TARGETS AND THE PHYSICAL PROPERTIES

OUTSIDE TARGET WINDOW

WITHIN TARGET WINDOW

208 — RECORD CONFIGURATION OF ATMOSPHERIC EFFECTS PODS

CLOSED LOOP FEEDBACK ATMOSPHERIC EFFECTS SYSTEMS

BACKGROUND

The United States Media and Entertainment Industry is the largest in the world. The United States Media and Entertainment Industry represents a third of the global media and entertainment industry which delivers events, such as musical events, theatrical events, sporting events, and/or motion picture events, to an audience for their viewing pleasure. Presently, venues, such as music venues and/or sporting venues to provide an example, deliver these events to the audience using audio-visual systems having various display screens surrounded by auditory speakers. Operators of these venues have made many attempts to further enhance the immersion of the audience as they are viewing these events. For example, these operators have used large flames to deliver conventional heating effects to the audience, but these large flames cannot be used within indoor venues and impose fire concerns. Other conventional heating systems, such as large radiant space heaters, have also been used to deliver the conventional heat effects, but these conventional heating systems are extremely inefficient, require an almost limitless amount of power, and also imposed fire concerns. Operators of these venues have used large air blowers, such as large industrial fans to provide an example, to deliver conventional cooling effects to the audience, but these large air blowers have difficulty in providing a large enough air volume to deliver these conventional cooling effects to the entire audience.

BRIEF DESCRIPTION OF THE DRAWINGS

The accompanying drawings, which are incorporated herein and form a part of the specification, illustrate the present disclosure and, together with the description, further serve to explain the principles thereof and to enable a person skilled in the pertinent art to make and use the same. In the drawings:

FIG. 1 graphically illustrates an exemplary closed loop feedback atmospheric effects system in accordance with some exemplary embodiments;

In the accompanying drawings, like reference numbers indicate identical or functionally similar elements. Additionally, the left most digit(s) of a reference number identifies the drawing in which the reference number first appears.

DETAILED DESCRIPTION

Figure 2:
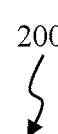
FIG. 2 illustrates a flowchart of the exemplary closed loop feedback atmospheric effects system in accordance with some exemplary embodiments of the present disclosure.
Figure 2:
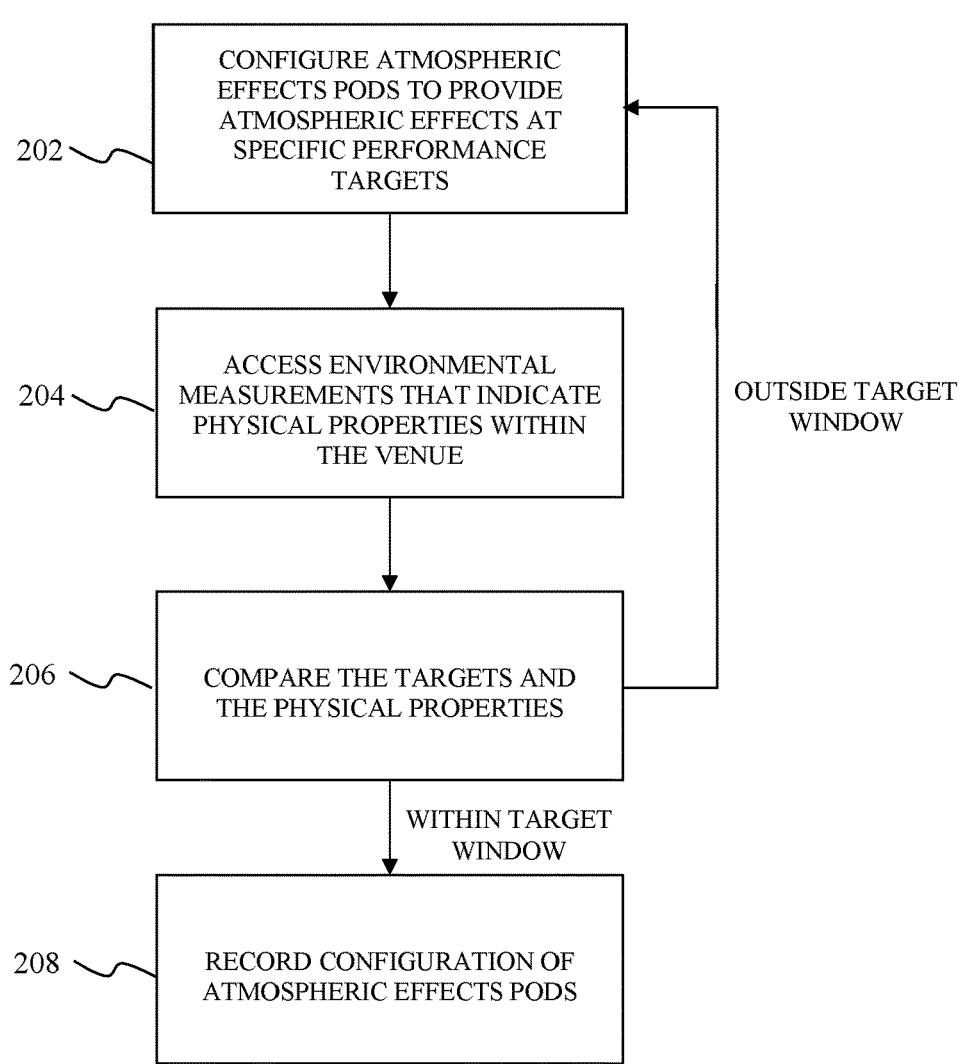

The following disclosure provides many different embodiments, or examples, for implementing different features of the provided subject matter. Specific examples of components and arrangements are described below to simplify the present disclosure. These are, of course, merely examples and are not intended to be limiting. Aspects of the present disclosure are best understood from the following detailed description when read with the accompanying figures. The present disclosure may repeat reference numerals and/or letters in the various examples. This repetition does not in itself dictate a relationship between the various embodiments and/or configurations discussed. It is noted that, in accordance with the standard practice in the industry, features are not drawn to scale. In fact, the dimensions of the features may be arbitrarily increased or reduced for clarity of discussion.

Overview

Systems, methods, and apparatuses disclosed herein can be implemented as a closed loop feedback system to provide various atmospheric effects. These systems, methods, and apparatuses can regulate these atmospheric effects based on one or more environmental measurements as part of the closed loop feedback system. As part of the closed loop feedback system, these systems, methods, and apparatuses can detect, or measure, one or more physical properties, such as temperature, atmospheric pressure, humidity, wind speed, wind direction, precipitation amount, scent, location, altitude, and/or azimuth to provide some examples. These systems, methods, and apparatuses can compare the one or more physical properties with one or more performance targets of the atmospheric effects and can regulate the atmospheric effects to cause the one or more physical properties to satisfy the one or more performance targets of the atmospheric effects.

Exemplary Closed Loop Feedback Atmospheric Effects System

Figure 1:
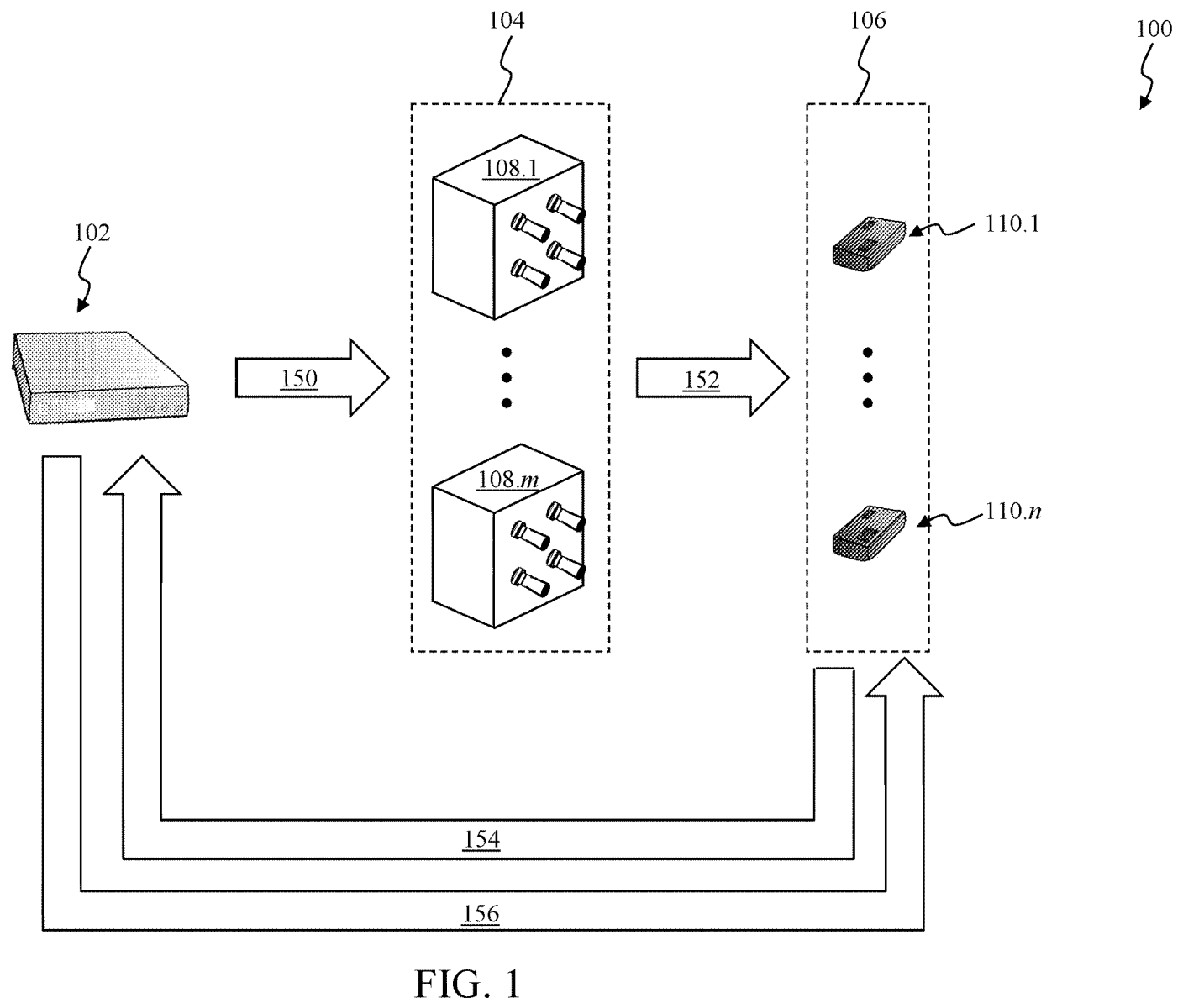

FIG. 1 graphically illustrates an exemplary closed loop feedback atmospheric effects system in accordance with some exemplary embodiments. In the exemplary embodiment illustrated in FIG. 1, an atmospheric effects system 100 represents a closed loop feedback system to provide various atmospheric effects within a venue, such as a music venue, for example, a music theater, a music club, and/or a concert hall, a sporting venue, for example, an arena, a convention center, and/or a stadium, and/or any other suitable venue that will be apparent to those skilled in the relevant (s) arts without departing the spirit and scope of the present disclosure. In some embodiments, these atmospheric effects can include an idle stream of air, a breeze stream of air, a blast stream of air, a cold stream of air, a cold breeze stream of air, a cold blast stream of air, a warm stream of air, a warm breeze stream of air, a warm blast stream of air, a scented stream of air, and/or any combination thereof to provide some examples. In these embodiments, the idle stream of air can be characterized as being a stream of air having a slow speed, for example, less than two (2) miles per hour (MPH), at a substantially similar temperature as the venue. In these embodiments, the breeze stream of air can be characterized as being a stream of air having a medium speed, for example, between two (2) MPH and seven (7) MPH, at a substantially similar temperature as the venue. In these embodiments, the blast stream of air can be characterized as being a stream of air having a high speed, for example, greater than seven (7) MPH, at a substantially similar temperature as the venue. In these embodiments, the cold stream of air can be characterized as being a stream of air having the slow speed at a colder temperature than the venue, for example, at least four (4) degrees or more colder than the temperature as the venue. In these embodiments, the cold breeze of air can be characterized as being a stream of air having the medium speed at a colder temperature than the venue, for example, at least four (4) degrees or more colder than the temperature as the venue. In these embodiments, the cold blast of air can be characterized as being a stream of air having the high speed at a colder temperature than the venue, for example, at least four (4) degrees or more colder than the temperature as the venue. In these embodiments, the hot stream of air can be characterized as being a stream of air having the slow speed at a hotter temperature than the venue, for example, at least four (4) degrees or more hotter than the temperature as the venue. In these embodiments, the hot breeze of air can be characterized as being a stream of air having the medium speed at a hotter temperature than the venue, for example, at least four (4) degrees or more hotter than the temperature as the venue. In these embodiments, the hot blast of air can be characterized as being a stream of air having the high speed at a hotter temperature than the venue, for example, at least four (4) degrees or more hotter than the temperature as the venue. In these embodiments, the scented stream of air can be characterized as being a stream of air having the idle stream of air, the breeze stream of air, the blast stream of air, the cold stream of air, the cold breeze stream of air, the cold blast stream of air, the warm stream of air, the warm breeze stream of air, and/or the warm blast stream of air that has been infused with one or more scents. In some embodiments, the atmospheric effects system 100 can be situated within the venue that hosts an event. In these embodiments, the event can include a musical event, a theatrical event, a sporting event, a motion picture, and/or any other suitable event that will be apparent to those skilled in the relevant art(s) without departing the spirit and scope of the present disclosure. In the exemplary embodiment illustrated in FIG. 1, the atmospheric effects system 100 includes an atmospheric effects control system 102, atmospheric effects pod system 104, and an atmospheric effects monitoring system 106.

The atmospheric effects control system 102 controls the overall configuration and/or operation of the atmospheric effects system 100. As illustrated in FIG. 1, the atmospheric effects control system 102 can provide atmospheric effects control signals 150 to configure the atmospheric effects pod system 104 to provide atmospheric effects 152. In some embodiments, the atmospheric effects control system 102 can provide the atmospheric effects control signals 150 to configure the atmospheric effects pod system 104 to provide the atmospheric effects 152 to the audience within the venue as the audience is experiencing the event. In some embodiments, the atmospheric effects 152 can include the idle stream of air, the breeze stream of air, the blast stream of air, the cold stream of air, the cold breeze stream of air, the cold blast stream of air, the warm stream of air, the warm breeze stream of air, the warm blast stream of air, the scented stream of air, and/or any combination thereof to provide some examples. In the exemplary embodiment illustrated in FIG. 1, the atmospheric effects control signals 150 can configure the atmospheric effects pod system 104 to provide the atmospheric effects 152 at one or more performance targets. In some embodiments, the one or more performance targets of the atmospheric effects 152 can include a temperature, an atmospheric pressure, a humidity, a wind speed, a wind direction, a precipitation amount, and/or a scent to provide some examples, to be provided by the atmospheric effects pod system 104.

The atmospheric effects control system 102 can regulate the atmospheric effects 152 provided by the atmospheric effects pod system 104 based on one or more environmental measurements 154 provided by the atmospheric effects monitoring system 106 as part of the closed loop feedback system. Generally, the one or more environmental measurements 154 provided by the atmospheric effects monitoring system 106 can indicate one or more physical properties. In some embodiments, the one or more physical properties can include temperature, atmospheric pressure, humidity, wind speed, wind direction, precipitation amount, scent, location, altitude, and/or azimuth to provide some examples. In some embodiments, the atmospheric effects control system 102 can receive the one or more environmental measurements 154 in real-time, or near real-time, from the atmospheric effects monitoring system 106. In these embodiments, the atmospheric effects control system 102 can receive the one or more environmental measurements 154 in real-time, or near real-time, from the atmospheric effects monitoring system 106 as the audience is experiencing the event. And, in some embodiments, the atmospheric effects 152 can introduce unwanted noise, such as thermal noise, shot noise, burst noise, also referred to as impulse noise, wind noise, white noise, pink noise, and/or any other suitable noise that will be apparent to those skilled in the relevant art(s) without departing from the spirit and scope of the present disclosure to provide some examples, into the one or more environmental measurements 154. In these embodiments, the atmospheric effects control system 102 can process the one or more environmental measurements 154 provided by the atmospheric effects monitoring system 106 to effectively smooth the one or more environmental measurements 154. In these embodiments, the atmospheric effects control system 102 can implement a data smoothing mechanism, such as a random method, a simple moving average, a random walk, a simple exponential, and/or an exponential moving average to provide some examples, to effectively smooth the one or more environmental measurements 154.

As to be described in further detail below, the atmospheric effects control system 102 can compare the one or more performance targets of the atmospheric effects 152 and the one or more physical properties as indicated by the one or more environmental measurements 154 provided by the atmospheric effects monitoring system 106. In some embodiments, the atmospheric effects control system 102 can control the atmospheric effects control signals 150 to regulate the atmospheric effects 152 to cause the one or more physical properties to satisfy the one or more performance targets of the atmospheric effects 152. In these embodiments, the atmospheric effects control system 102 can control the atmospheric effects control signals 150 to regulate the atmospheric effects 152 based upon a difference between the one or more performance targets of the atmospheric effects 152 and the one or more physical properties. For example, the atmospheric effects control system 102 can vary the atmospheric effects control signals 150 when the difference between the one or more performance targets of the atmospheric effects 152 and the one or more physical properties is outside of a target window, for example, within one (1) percent, to augment the atmospheric effects 152, for example, adjust temperature, adjust atmospheric pressure, adjust humidity, adjust wind speed, adjust wind direction, adjust precipitation amount, and/or adjust scent of the atmospheric effects 152. Otherwise, in this example, the atmospheric effects control system 102 can maintain the atmospheric effects control signals 150 when the difference between the one or more performance targets of the atmospheric effects 152 and the one or more physical properties is within the target window to maintain the atmospheric effects 152, for example, maintain temperature, maintain atmospheric pressure, maintain humidity, maintain wind speed, maintain wind direction, maintain precipitation amount, and/or maintain scent of the atmospheric effects 152.

The atmospheric effects pod system 104 provides the atmospheric effects 152, for example, to the audience within the venue as the audience is experiencing the event. In the exemplary embodiment illustrated in FIG. 1, the atmospheric effects pod system 104 can include atmospheric effects pods 108.1 through 108.*m*. As illustrated in FIG. 1, the atmospheric effects pods 108.1 through 108.*m* can provide the atmospheric effects 152 at the one or more performance targets in accordance with the atmospheric effects control signals 150 received from the atmospheric effects control system 102. In some embodiments, the atmospheric effects pods 108.1 through 108.*m* can configure one or more characteristics, parameters, and/or attributes of the atmospheric effects 152, such as temperature, atmospheric pressure, humidity, wind speed, wind direction, precipitation amount, and/or scents to provide some examples, to be at the one or more performance targets in accordance with the atmospheric effects control signals 150. The atmospheric effects pods 108.1 through 108.*m* are further described in U.S. patent application Ser. No. 16/997,518, filed Aug. 19, 2020, now U.S. Pat. No. 11,266,921, which is hereby incorporated by reference here in its entirety.

The atmospheric effects monitoring system 106 can provide the one or more environmental measurements 154 to be used by the atmospheric effects control system 102 to regulate the atmospheric effects 152 as part of the closed loop feedback system. In the exemplary embodiment illustrated in FIG. 1, the atmospheric effects control system 102 can provide atmospheric monitoring control signals 156 to the atmospheric effects monitoring system 106 to cause the atmospheric effects monitoring system 106 to provide the one or more environmental measurements 154. In some embodiments, the atmospheric effects control system 102 can provide the atmospheric monitoring control signals 156 to trigger the atmospheric effects monitoring system 106 to detect, or to measure, one or more physical properties, such as temperature, atmospheric pressure, humidity, wind speed, wind direction, precipitation amount, scent, location, altitude, and/or azimuth to provide some examples. In these embodiments, the atmospheric effects control system 102 can provide the atmospheric monitoring control signals 156 at a first logical level, such as a logical one to provide an example, to trigger the atmospheric effects monitoring system 106 to detect, or to measure, the one or more physical properties and/or at a second logical level, such as a logical zero to provide an example, to cease the atmospheric effects monitoring system 106 from detecting, or measuring, the one or more physical properties. In the exemplary embodiment illustrated in FIG. 1, the atmospheric effects monitoring system 106 can include atmospheric effects sensors 110.1 through 110.*n*. Generally, the atmospheric effects sensors 110.1 through 110.*n* can include sensors to detect, or to measure, the one or more physical properties and to record, or indicate, these physical properties as the one or more environmental measurements 154. In some embodiments, the atmospheric effects monitoring system 106 can detect, or measure, the one or more physical properties in real-time, or near real-time. In these embodiments, the atmospheric effects monitoring system 106 can detect, or measure, the one or more physical properties in real-time, or near real-time as the audience is experiencing the event. In the exemplary embodiment illustrated in FIG. 1, the atmospheric effects sensors 110.1 through 110.*n* can be implemented as stationary electrical, mechanical, and/or electro-mechanical devices that can be incorporated within or coupled to the venue, for example, incorporated within or coupled to seats, rails, and/or walls within the venue to provide some examples, mobile electrical, mechanical, and/or electro-mechanical devices that move, for example, about the venue or elsewhere, and/or any combination thereof.

Exemplary Operation of the Exemplary Closed Loop Feedback Atmospheric Effects System FIG. 2 illustrates a flowchart of the exemplary closed loop feedback atmospheric effects system in accordance with some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an operational control flow 200 to provide atmospheric effects within a venue, such as a music venue, for example, a music theater, a music club, and/or a concert hall, a sporting venue, for example, an arena, a convention center, and/or a stadium, and/or any other suitable venue that will be apparent to those skilled in the relevant art(s) without departing the spirit and scope of the present disclosure. In some embodiments, these atmospheric effects can include the idle stream of air, the breeze stream of air, the blast stream of air, the cold stream of air, the cold breeze stream of air, the cold blast stream of air, a the warm stream of air, the warm breeze stream of air, the warm blast stream of air, the scented stream of air, and/or any combination thereof to provide some examples as described above. In some embodiments, the atmospheric effects system can be situated within the venue that hosts an event. In these embodiments, the event can include a musical event, a theatrical event, a sporting event, a motion picture, and/or any other suitable event that will be apparent to those skilled in the relevant art(s) without departing the spirit and scope of the present disclosure. The operational control flow 200 to be described in further detail below can be used to calibrate atmospheric effects pod system, such as the atmospheric effects pods 108.1 through 108.*m* to provide an example, to provide the atmospheric effects within the venue. In some embodiments, the operational control flow 200 to be described in further detail below is to calibrate the atmospheric effects pod system to provide the atmospheric effects within the venue without the audience being present within the venue. The operational control flow 200 can be performed by, for example, the atmospheric effects control system 102 as described above.

At operation 202, the operational control flow 200 configures the atmospheric effects pod system to provide the atmospheric effects within the venue at one or more specific performance targets, such as a specific temperature, a specific atmospheric pressure, a specific humidity, a specific wind speed, a specific wind direction, a specific precipitation amount, and/or a specific scent to provide some examples, in a substantially similar manner as described above. In some embodiments, the operational control flow 200 can configure the atmospheric effects pod system to provide the atmospheric effects at the one or more specific performance targets within the venue without the audience being present in the venue. In these embodiments, the operational control flow 200 can configure the atmospheric effects pod system to provide the atmospheric effects at the one or more specific performance targets within the venue with or without the event being hosted by the venue.

At operation 204, the operational control flow 200 accesses one or more environmental measurements, such as the one or more environmental measurements 154 as described above, that indicate one or more physical properties in a substantially similar manner as described above. In some embodiments, the one or more physical properties can include temperature, atmospheric pressure, humidity, wind speed, wind direction, precipitation amount, scent, location, altitude, and/or azimuth to provide some examples. At operation 206, the operational control flow 200 compares the one or more specific performance targets from operation 202 and the one or more physical properties. The operational control flow reverts to operation 202 to re-configure the atmospheric effects pod system to provide the atmospheric effects at the one or more specific performance targets from operation 202 when a difference between the one or more specific performance targets from operation 202 and the one or more physical properties from operation 204 is outside of a target window, for example, within one (1) percent. Otherwise, the operational control flow proceeds to operation 208 when the difference between the one or more specific performance targets from operation 202 and the one or more physical properties from operation 204 is within the target window.

At operation 208, the operational control flow 200 records the configuration of the atmospheric effects pod system from operation 202 that provided the atmospheric effects at the one or more specific performance targets from operation 202. In some embodiments, the operational control flow 200 can store the configuration of the atmospheric effects pod as an organized collection of data, often referred to as a database, that can be indexed by the one or more specific performance targets from operation 202. The database may include one or more data tables having data values, such as alphanumeric strings, integers, decimals, floating points, dates, times, binary values, Boolean values, and/or enumerations to provide some examples. The database can be a columnar database, a relational database, a key-store database, a graph database, and/or a document store to provide some examples. In some embodiments, the operational control flow 200 can record the configuration of the atmospheric effects pod system from operation 202 that provided the atmospheric effects at the one or more specific performance targets without the event being hosted by the venue and without the audience being present in the venue to generate a generic atmospheric effects calibration database that is associated with the venue. As another example, the operational control flow 200 can record the configuration of the atmospheric effects pod system from operation 202 that provided the atmospheric effects at the one or more specific performance targets with the event being hosted by the venue and without the audience being present in the venue to generate an event atmospheric effects calibration database that is associated with the venue. After recording the configuration of the atmospheric effects pod system from operation 202, the operational control flow 200 can revert to operation 202 to configure the atmospheric effects pod system to provide the atmospheric effects within the venue at one or more other specific performance targets, such as another specific temperature, another specific atmospheric pressure, another specific humidity, another specific wind speed, another specific wind direction, another specific precipitation amount, and/or another specific scent to provide some examples.

Exemplary Calibrated Closed Loop Feedback Atmospheric Effects System

Figure 3:
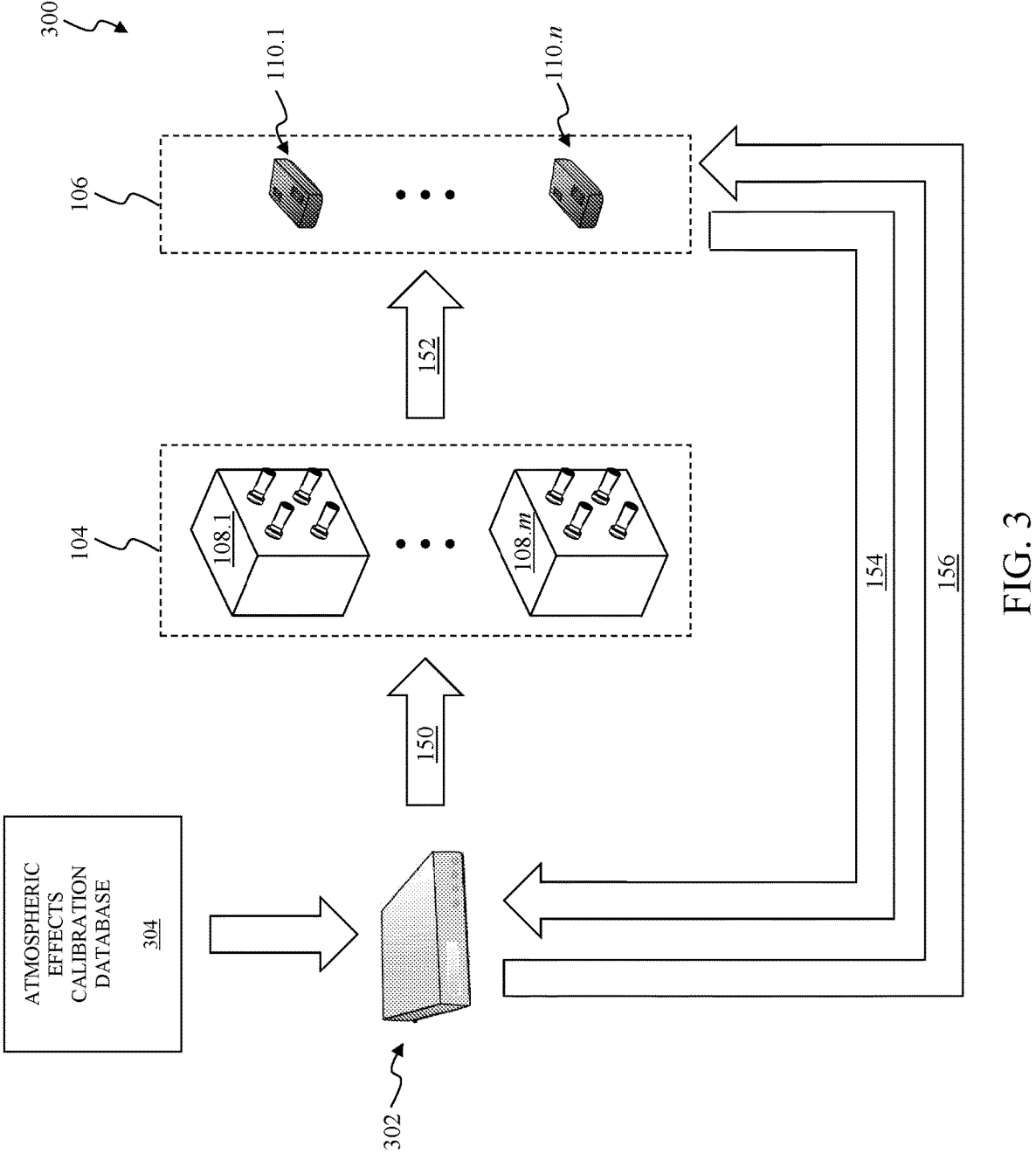
FIG. 3 graphically illustrates an exemplary calibrated closed loop feedback atmospheric effects system in accordance with some exemplary embodiments.

FIG. 3 graphically illustrates an exemplary calibrated closed loop feedback atmospheric effects system in accordance with some exemplary embodiments. In the exemplary embodiment illustrated in FIG. 3, an atmospheric effects system 300 represents a calibrated closed loop feedback system to provide various atmospheric effects within a venue, such as a music venue, for example, a music theater, a music club, and/or a concert hall, a sporting venue, for example, an arena, a convention center, and/or a stadium, and/or any other suitable venue that will be apparent to those skilled in the relevant art(s) without departing the spirit and scope of the present disclosure. In some embodiments, these atmospheric effects can include the idle stream of air, the breeze stream of air, the blast stream of air, the cold stream of air, the cold breeze stream of air, the cold blast stream of air, the warm stream of air, the warm breeze stream of air, the warm blast stream of air, the scented stream of air, and/or any combination thereof as described above. In some embodiments, the atmospheric effects system 300 can be situated within the venue that hosts an event. In these embodiments, the event can include a musical event, a theatrical event, a sporting event, a motion picture, and/or any other suitable event that will be apparent to those skilled in the relevant art(s) without departing the spirit and scope of the present disclosure. As to be described in further detail below, the atmospheric effects system 300 can access an organized collection of data, often referred to as a database, to configure the venue to provide the atmospheric effects to the audience within the venue as the audience is experiencing the event. In the exemplary embodiment illustrated in FIG. 3, the atmospheric effects system 300 includes the atmospheric effects pod system 104, the atmospheric effects monitoring system 106, and an atmospheric effects control system 302. The atmospheric effects system 300 includes many substantially similar features as the atmospheric effects system 100 as described above. Therefore, only differences between the atmospheric effects system 300 and the atmospheric effects system 100 are to be described in further detail below.

The atmospheric effects control system 302 controls the overall configuration and/or operation of the atmospheric effects system 300. As illustrated in FIG. 3, the atmospheric effects control system 302 can provide the atmospheric effects control signals 150 to configure the atmospheric effects pod system 104 to provide atmospheric effects 152 in a substantially similar manner as described above. In some embodiments, the atmospheric effects control signals 150 can configure the atmospheric effects pod system 104 to provide the atmospheric effects 152 at the one or more performance targets as outlined by event information. Generally, the event information describes the one or more performance targets of the atmospheric effects 152 to be provided by the atmospheric effects pod system 104 in relation to an event. The event can represent a musical event, a theatrical event, a sporting event, a motion picture, and/or any other suitable event that will be apparent to those skilled in the relevant art(s) without departing the spirit and scope of the present disclosure. In some embodiments, the one or more performance targets of the atmospheric effects 152 can be one or more absolute performance targets of the atmospheric effects 152, such as a specific temperature, a specific atmospheric pressure, a specific humidity, a specific wind speed, a specific wind direction, a specific precipitation amount, and/or a specific scent to provide some examples, one or more relative performance targets of the atmospheric effects 152, such as a temperature differential, an atmospheric pressure differential, a humidity differential, a wind speed differential, a wind direction differential, a precipitation amount differential, and/or a scent differential to provide some examples, and/or any combination thereof. In some embodiments, the atmospheric effects control system 302 can access an atmospheric effects calibration database 304 that outlines the atmospheric effects control signals 150 to configure the atmospheric effects pod system 104 to provide the atmospheric effects 152 at the one or more performance targets as outlined by the event information. For example, the event information can indicate that the atmospheric effects pod system 104 are provide the atmospheric effects 152 at a specific performance target, such as a specific temperature, a specific atmospheric pressure, a specific humidity, a specific wind speed, a specific wind direction, a specific precipitation amount, and/or a specific scent to provide some examples. In this example, the atmospheric effects control system 302 can access the atmospheric effects calibration database 304 that outlines the atmospheric effects control signals 150 to configure the atmospheric effects pod system 104 to provide the atmospheric effects 152 at the specific performance target. In some embodiments, the atmospheric effects calibration database 304 can include the generic atmospheric effects calibration database and/or the event atmospheric effects calibration database as described above.

Exemplary Atmospheric Effects Sensor

Figure 4:
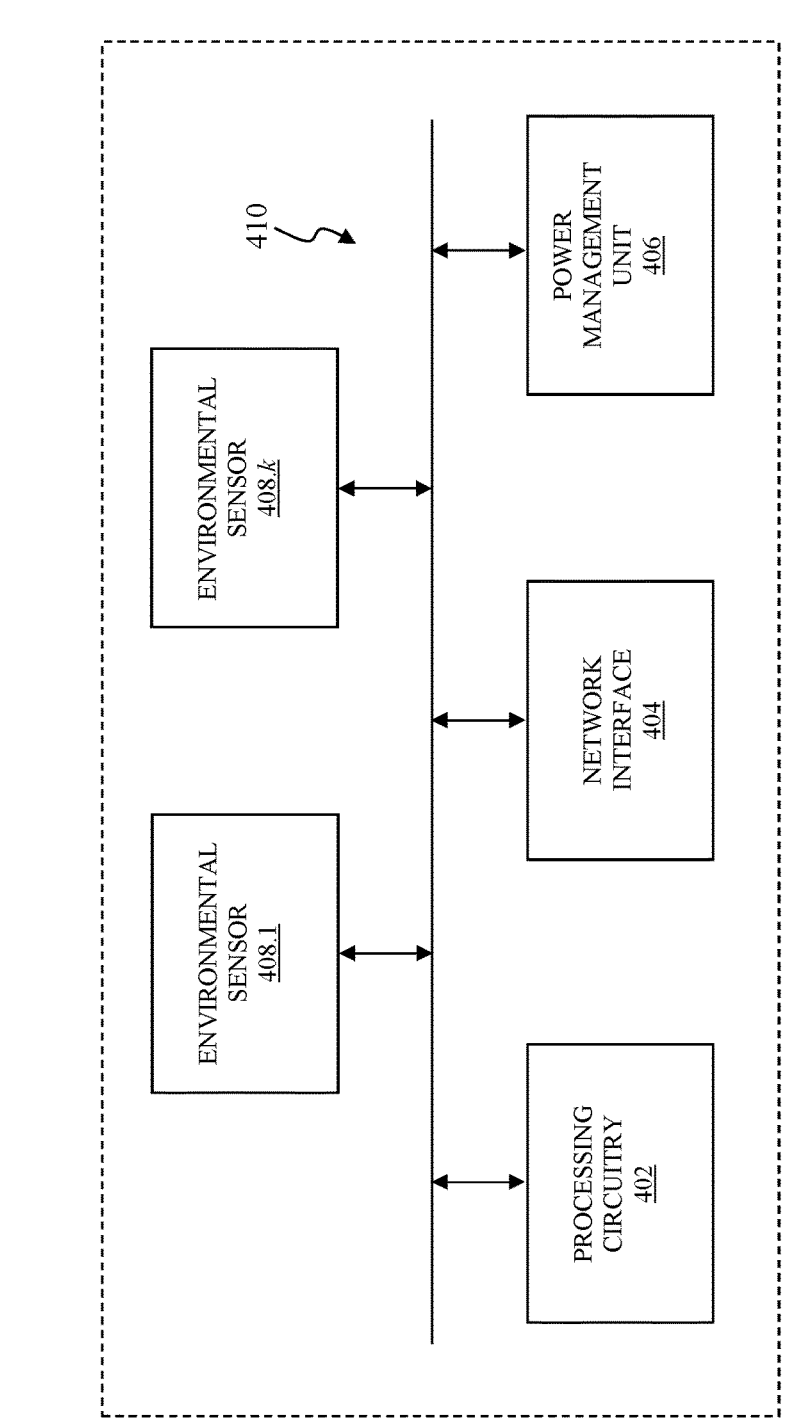
FIG. 4 graphically illustrates a block diagram of an exemplary atmospheric effects sensor in accordance with some exemplary embodiments.

FIG. 4 graphically illustrates a block diagram of an exemplary atmospheric effects sensor in accordance with some exemplary embodiments. In the exemplary embodiment illustrated in FIG. 4, an atmospheric effects sensor 400 can detect, or measure, one or more physical properties, such as temperature, atmospheric pressure, humidity, wind speed, wind direction, precipitation amount, scent, location, altitude, and/or azimuth to provide some examples, and to record, or indicate, these physical properties as one or more environmental measurements, such as the one or more environmental measurements 154 as described above. As illustrated in FIG. 4, the atmospheric effects sensor 400 can include processing circuitry 402, a network interface 404, a power management unit 406, and environmental sensors 408.1 through 408.$k$ that can be communicatively coupled to one another over a communications bus 410. The atmospheric effects sensor 400 can represent an exemplary embodiment of one or more of the atmospheric effects sensors 110.1 through 110.$n$ as described above.

The processing circuitry 402 controls the overall configuration and/or operation of the atmospheric effects sensor 400. Herein, processing circuitry shall be understood to be one or more: circuit(s), processor(s), or a combination thereof. For example, a circuit can include an analog circuit, a digital circuit, state machine logic, other structural electronic hardware, or a combination thereof. The processing circuitry can include a microprocessor, a digital signal processor (DSP), or other hardware processor. The processing circuitry can be "hard-coded" with instructions to perform corresponding function(s) according to embodiments described herein. Alternatively, the processing circuitry can access memory to retrieve instructions stored in the memory, which when executed by the processing circuitry, can cause the processing circuitry to perform the corresponding function(s) associated with the processing circuitry. In the exemplary embodiment illustrated in FIG. 4, the processing circuitry 402 can trigger the environmental sensors 408.1 through 408.$k$ to detect, or to measure, one or more physical properties, such as temperature, atmospheric pressure, humidity, wind speed, wind direction, precipitation amount, scent, location, altitude, and/or azimuth to provide some examples. In some embodiments, the processing circuitry 402 can receive atmospheric monitoring control signals, such as the atmospheric monitoring control signals 156 to provide an example, from an atmospheric effects control system, such as the atmospheric effects control system 102 and/or the atmospheric effects control system 302 to provide some examples. In these embodiments, the atmospheric monitoring control signals can be at a first logical level, such as a logical one to provide an example, to trigger the environmental sensors 408.1 through 408.$k$ to detect, or to measure, the one or more physical properties and/or at a second logical level, such as a logical zero to provide an example, to cease the environmental sensors 408.1 through 408.$k$ from detecting, or measuring, the one or more physical properties. Thereafter, the processing circuitry 402 can poll the environmental sensors 408.1 through 408.$k$ for the one or more physical properties to record, or indicate, these physical properties as one or more environmental measurements, such as the one or more environmental measurements 154 to provide an example. In some embodiments, the processing circuitry 402 can format, for example, packetize, the one or more physical properties received from the environmental sensors 408.1 through 408.$k$ to provide the one or more environmental measurements. In these embodiments, the one or more environmental measurements can include one or more digital packets of measurements that includes headers identifying the atmospheric effects sensor 400 and the one or more physical properties from one or more environmental sensors from among the environmental sensors 408.1 through 408.$k$. In some embodiments, the headers can include unique identifiers that identifies the atmospheric effects sensor 400. In these embodiments, the unique identifiers can include an Internet Protocol (IP) address of the atmospheric effects sensor 400, a media access controller (MAC) address of the atmospheric effects sensor 400, a model name of the atmospheric effects sensor 400, a serial number of the atmospheric effects sensor 400, a manufacturer name of the atmospheric effects sensor 400, electronic credentials, such as a username and/or a password, that is associated with the atmospheric effects sensor 400; and/or any other suitable unique identifier that will be recognized by those skilled in the relevant art(s) without departing from the spirit and scope of the present disclosure.

The network interface 404 provides an interface between the atmospheric effects sensor 400 and another electrical, mechanical, and/or electro-mechanical device, such as the atmospheric effects control system to provide an example. The network interface 404 can implemented as a wireless network interface, a wireline network interface, and/or any combination thereof that will be apparent to those skilled in the relevant art(s) without departing from the spirit and scope of the present disclosure. In some embodiments, the network interface 404 can be communicatively coupled to the other electrical, mechanical, and/or electro-mechanical device via one or more wireline transmission mediums, such as one or more twisted pair cables, one or more Ethernet cables, one or more coaxial cables, and/or one or more optical fiber cables to provide some examples. In some embodiments, the network interface 404 can be communicatively coupled to the other electrical, mechanical, and/or electro-mechanical device via one or more wireless transmission mediums, such as one or more radio links, one or more microwave links, one or more satellite links, one or more Bluetooth links, one or more WIFI links to provide some examples. In the exemplary embodiment illustrated in FIG. 4, the network interface 404 can receive the atmospheric monitoring control signals from the atmospheric effects control system over the one or more wireline transmission mediums, the one or more wireless transmission mediums, and/or any combination thereof and can transmit the one or more environmental measurements to the atmospheric effects control system over the one or more wireline transmission mediums, the one or more wireless transmission mediums, and/or any combination thereof.

The power management unit 406 is responsible for power system management of the atmospheric effects sensor 400. In the exemplary embodiment illustrated in FIG. 4, the power management unit 406 can regulate one or more input powers to provide one or more output powers for operation of the atmospheric effects sensor 400. In some embodiments, the one or more input powers can be provided by one or more batteries that store energy in a chemical form that is converted into electrical energy via electrochemical reactions to operate the atmospheric effects sensor 400. In these embodiments, the one or more batteries can include one or more rechargeable battery cells that can be implemented using one or more nickel-cadmium (NiCd) rechargeable battery cells, one or more nickel-iron (NiFe) rechargeable battery cells, one or more nickel-metal hydride (NiMH) rechargeable battery cells, one or more lithium-ion rechargeable battery cells, and/or lithium-ion polymer (LiPo) battery cells, and/or any other suitable battery chemistry, or chemistries, that will be recognized by those skilled in the relevant art(s) without departing from the spirit and scope of the present disclosure. In some embodiments, the power management unit 406 can include a battery charging system to recharge the one or more batteries when appropriate. For example, the power management unit 406 can use the power signals received from the one or more rechargeable battery to monitor power connections and battery charges and/or to charge the one or more batteries when necessary. Alternatively, or in addition to, the one or more input powers can be provided over the one or more wireline transmission mediums, such as the one or more twisted pair cables, the one or more Ethernet cables, and/or the one or more coaxial cables to provide some examples. In some embodiments, the power management unit 406 can receive the one or more input powers and the atmospheric monitoring control signals over the one or more wireline transmission mediums according to a known Power over Ethernet (POE) standard, such as the IEEE 802.3af™ standard, the IEEE 802.3at™ standard, a legacy PoE transmission, and/or any suitable type of PoE transmission standard to provide some examples. In these embodiments, the atmospheric effects sensor 400 represents a powered device (PD) that receives the one or more input powers and the atmospheric monitoring control signals from a power source equipment, such as the atmospheric effects control system. In some embodiments, the network interface 404 and/or the power management unit 406 can separate the one or more input powers and the atmospheric monitoring control signals from one another, for example, using one or more transformers. In these embodiments, the network interface 404 and/or the power management unit 406 include one or more data transceivers that operate according to a known communications standard, such as a version of an Institute of Electrical and Electronics Engineers (IEEE) 802.3 communication standard to provide an example, to receive the atmospheric monitoring control signals from the atmospheric effects control system.

The environmental sensors 408.1 through 408.$k$ can detect, or measure, the one or more physical properties, such as the temperature, the atmospheric pressure, the humidity, the wind speed, the wind direction, the precipitation amount, the scent, the location, the altitude, and/or the azimuth to provide some examples. The environmental sensors 408.1 through 408.$k$ can include sensors to detect, or to measure, one or more physical properties, such as temperature, atmospheric pressure, humidity, wind speed, wind direction, precipitation amount, scent, location, altitude, and/or azimuth to provide some examples. In some embodiments, the processing circuitry 402 can trigger the environmental sensors 408.1 through 408.$k$ to detect, or to measure, the one or more physical properties in a substantially similar manner as described above. In some embodiments, the environmental sensors 408.1 through 408.$k$ can provide the one or more physical properties to the processing circuitry 402. In these embodiments, the processing circuitry 402 can poll the environmental sensors 408.1 through 408.$k$ for the one or more physical properties to record, or indicate, these physical properties in a substantially similar manner as described above. In some embodiments, the environmental sensors 408.1 through 408.$k$ can include one or more thermometers, one or more barometers, one or more hygrometers, one or more anemometers, one or more rain gauges, one or more snow gauges, one or more olfactometers, one or more position sensors, for examples, one or more Global Positioning System (GPS) sensors, and/or one or more altimeters to provide some examples.

The communications bus 410 communicatively couples the processing circuitry 402, the network interface 404, the power management unit 406, and/or the environmental sensors 408.1 through 408.$k$ to one another. In some embodiments, the communications bus 410 can be situated within a printed circuit board (PCB) having various transmission lines, such as stripline or microstrip to provide some examples, to form electrical connections between the processing circuitry 402, the network interface 404, the power management unit 406, and/or the environmental sensors 408.1 through 408.$k$. Alternatively, or in addition to, the communications bus 410 can include one or more wireline transmission mediums, such as one or more twisted pair cables, one or more Ethernet cables, one or more coaxial cables, and/or one or more optical fiber cables to provide some examples, to form the electrical connections between the processing circuitry 402, the network interface 404, the power management unit 406, and/or the environmental sensors 408.1 through 408.$k$.

Figure 5A:
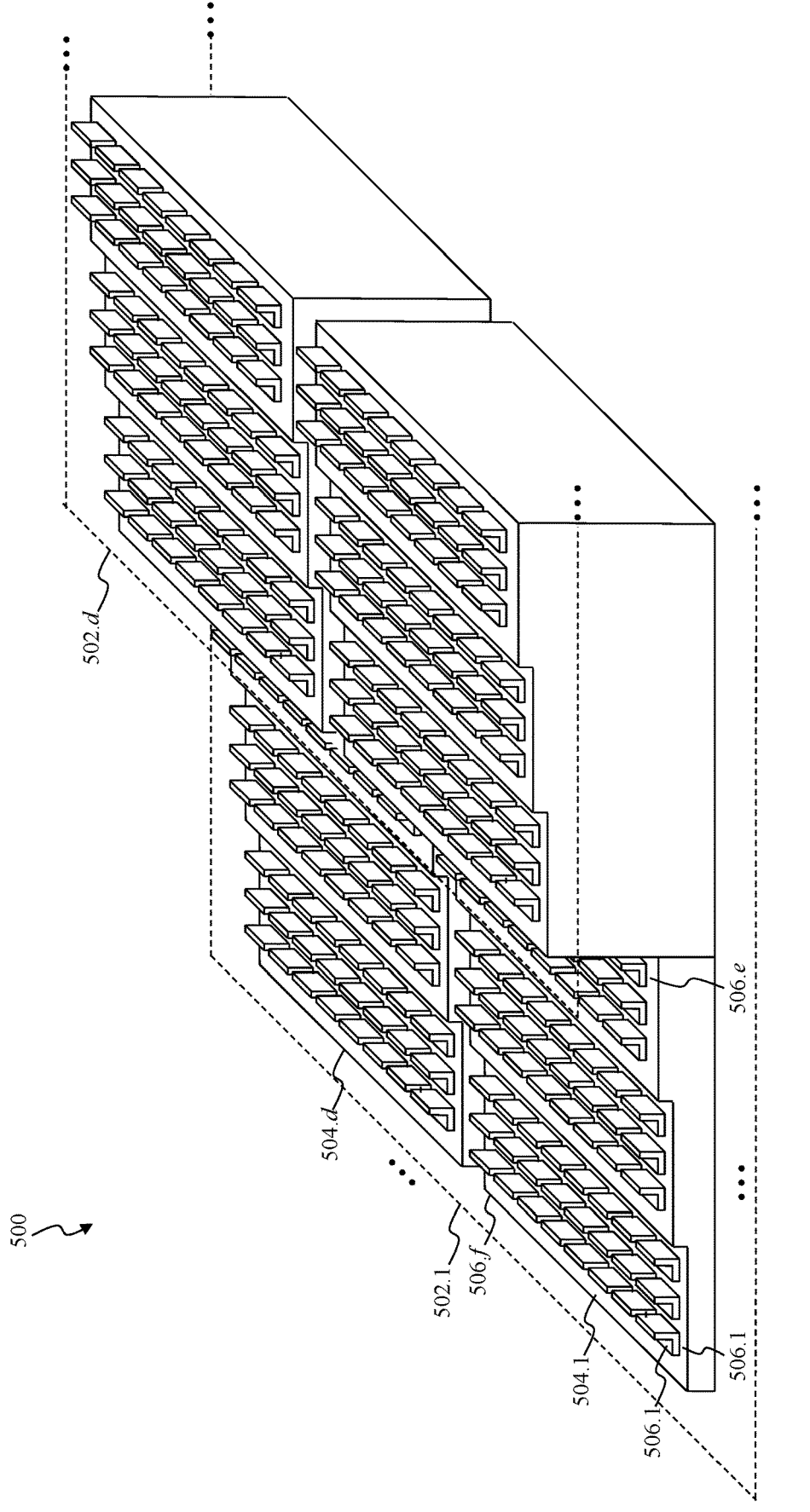
FIG. 5A and FIG. 5B illustrate pictorial representations of exemplary venues in accordance with some exemplary embodiments.
Figure 5B:
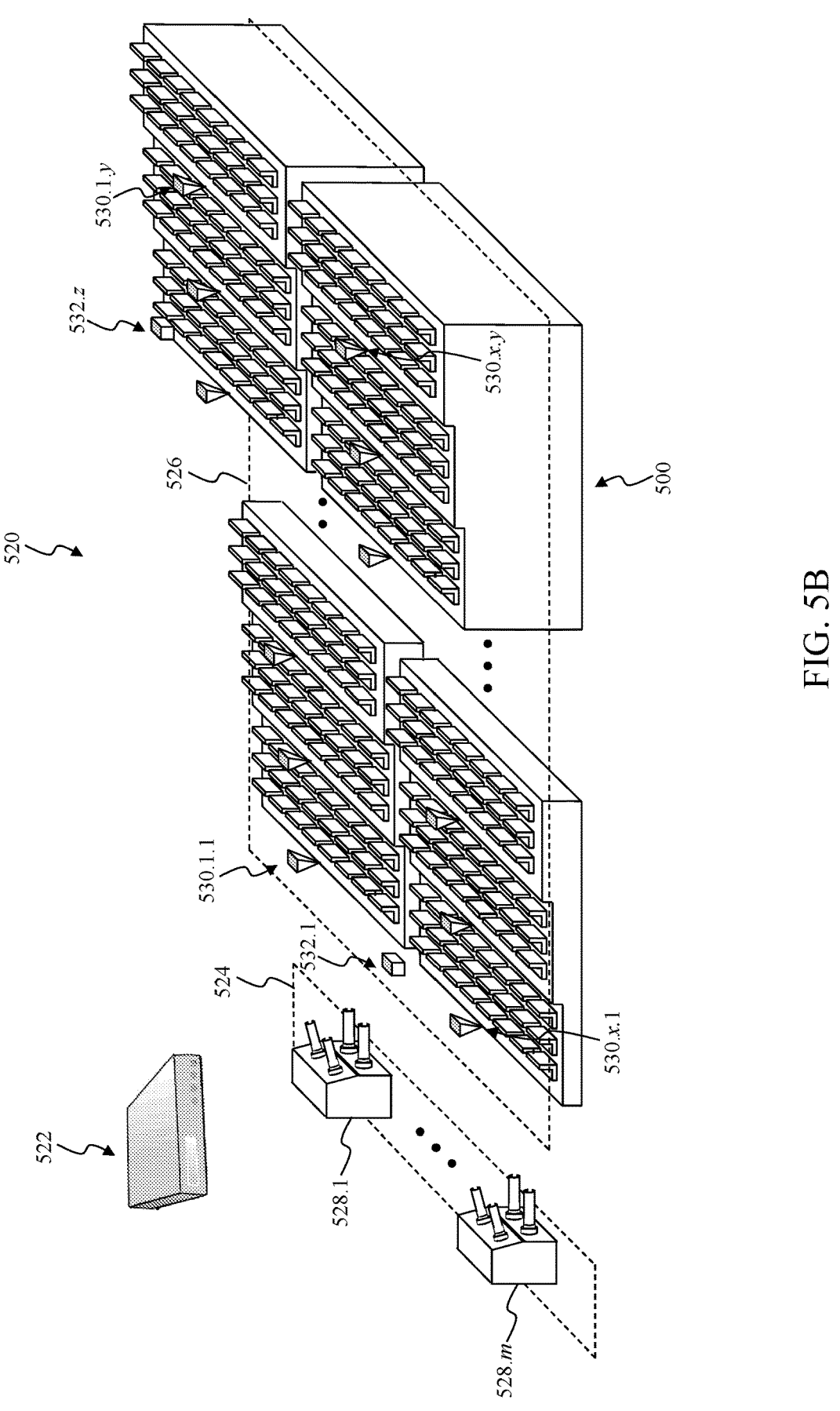

Exemplary Venue Having the Exemplary Closed Loop Feedback Atmospheric Effects System FIG. 5A and FIG. 5B illustrate pictorial representations of exemplary venues in accordance with some exemplary embodiments. In the exemplary embodiment illustrated in FIG. 5, a venue 500 represents a location for hosting an event. For example, the venue 500 can represent a music venue, for example, a music theater, a music club, and/or a concert hall, a sporting venue, for example, an arena, a convention center, and/or a stadium, and/or any other suitable venue that will be apparent to those skilled in the relevant art(s) without departing the spirit and scope of the present disclosure. The event can represent a musical event, a theatrical event, a sporting event, a motion picture, and/or any other suitable event that will be apparent to those skilled in the relevant art(s) without departing the spirit and scope of the present disclosure. In the exemplary embodiment illustrated in FIG. 5, the venue 500 includes one or more seating levels 502.1 through 502.$d$ to seat an audience to view the event. In some embodiments, the seating levels 502.1 through 502.$d$ represent different seating levels at different heights for viewing the event. As illustrated in FIG.

5A, the seating section 502.1 represents a lower seating level for viewing the event and the seating section 502.*d* represents an upper seating level above the seating section 502.1 for viewing the event. The seating levels 502.1 through 502.*d* can include seating sections 504.1 through 504.*d* for seating the audience to view the event. The seating sections 504.1 through 504.*d* for can include rows of seats 506.1 through 506.*e* for seating the audience to view the event. In some embodiments, the rows of seats 506.1 through 506.*e* represent different rows of seats at different heights for viewing the event. As illustrated in FIG. 5A, the row of seats 506.1 represents a lower row of seats for viewing the event and row of seats 506.*e* represents an upper row of seats above the row of seats 506.1 for viewing the event. As illustrated in FIG. 5A, the rows of seats 506.1 through 506.*e* include seats 508.1 through 508.*f* for seating the audience to view the event. Although the discussion of FIG. 5B to follow is to be described in terms of the venue 500, those skilled in the relevant art(s) will recognize the teachings herein are similarly applicable to other venues having more or less seating sections, more or less rows of seats, and/or more or less seats without departing from the spirit and scope of the present disclosure.

As illustrated in FIG. 5B, an atmospheric effects system 520 can be situated within the venue 500 to provide various atmospheric effects within the venue 500. In some embodiments, these atmospheric effects can include the idle stream of air, the breeze stream of air, the blast stream of air, the cold stream of air, the cold breeze stream of air, the cold blast stream of air, the warm stream of air, the warm breeze stream of air, the warm blast stream of air, the scented stream of air, and/or any combination thereof as described above. In some embodiments, the atmospheric effects system 520 can be situated within the venue that hosts an event. In these embodiments, the event can include a musical event, a theatrical event, a sporting event, a motion picture, and/or any other suitable event that will be apparent to those skilled in the relevant art(s) without departing the spirit and scope of the present disclosure. In the exemplary embodiment illustrated in FIG. 5B, the atmospheric effects system 520 can include an atmospheric effects control system 522, atmospheric effects pod system 524, and an atmospheric effects monitoring system 526. The atmospheric effects system 520 can represent an exemplary embodiment of the atmospheric effects system 100 and/or the atmospheric effects system 300 as described above. The atmospheric effects system 523 includes many substantially similar features as the atmospheric effects system 100 and/or the atmospheric effects system 300 as described above. Therefore, only differences between the atmospheric effects system 300 and the atmospheric effects system 100 and/or the atmospheric effects system 300 are to be described in further detail below.

The atmospheric effects control system 522 controls the overall configuration and/or operation of the atmospheric effects system 520. As illustrated in FIG. 5B, the atmospheric effects control system 522 can provide atmospheric effects control signals, such as the atmospheric effects control signals 150 to provide an example, to configure the atmospheric effects pod system 524 to provide atmospheric effects, such as the atmospheric effects 152 as described above, in a substantially similar manner as described above.

The atmospheric effects pod system 524 provide the atmospheric effects, for example, to the audience within the venue as the audience is experiencing the event. In the exemplary embodiment illustrated in FIG. 5B, the atmospheric effects pod system 524 can include atmospheric effects pods 528.1 through 528.*m*. As illustrated in FIG. 5B, the atmospheric effects pods 528.1 through 528.*m* can provide the atmospheric effects at the one or more performance targets in accordance with the atmospheric effects control signals received from the atmospheric effects control system 522 in a substantially similar manner as described above.

The atmospheric effects monitoring system 526 can provide one or more environmental measurements, such as the one or more environmental measurements 154 to provide an example, to be used by the atmospheric effects control system 522 to regulate the atmospheric effects in a substantially similar manner as described above. In the exemplary embodiment illustrated in FIG. 1, the atmospheric effects control system 522 can provide atmospheric monitoring control signals to the atmospheric effects monitoring system 526 to cause the atmospheric effects monitoring system 526 to provide the one or more environmental measurements in a substantially similar manner as described above. In some embodiments, the atmospheric effects control system 522 can provide the atmospheric monitoring control signals to trigger the atmospheric effects monitoring system 526 to detect, or to measure, one or more physical properties, such as temperature, atmospheric pressure, humidity, wind speed, wind direction, precipitation amount, scent, location, altitude, and/or azimuth to provide some examples in a substantially similar manner as described above. In the exemplary embodiment illustrated in FIG. 5B, the atmospheric effects monitoring system 526 can include atmospheric effects sensors 530.1.1 through 530.*x.y* and atmospheric effects sensors 532.1 through 532.*z*. The atmospheric effects sensors 530.1.1 through 530.*x.y* are illustrated in FIG. 5B using pyramidal shapes and the atmospheric effects sensors 532.1 through 532.*z* are illustrated in FIG. 5B using cubic shapes. In some embodiments, one or more of the atmospheric effects sensors 530.1.1 through 530.*x.y* and/or the atmospheric effects sensors 532.1 through 532.*z* can be implemented using the atmospheric effects sensor 400 as described above.

As illustrated in FIG. 5B, the atmospheric effects sensors 530.1.1 through 530.*x.y* can be arranged in a series of x rows of atmospheric effects sensors and/or a series of y columns of atmospheric effects sensors within the venue 500 to form an array of atmospheric effects sensors to detect, or to measure, the one or more physical properties in a substantially similar manner as described above. However, other arrangements for the atmospheric effects sensors 530.1.1 through 530.*x.y* are possible without departing from the spirit and scope of the present disclosure. In the exemplary embodiment illustrated in FIG. 5B, the atmospheric effects sensors 530.1.1 through 530.*x.y* can be implemented as stationary electrical, mechanical, and/or electro-mechanical devices that can be incorporated within or coupled to the venue, for example, incorporated within or coupled to seats, rails, and/or walls within the venue 500. However, those skilled in the relevant art(s) will recognize that the specific placement of the atmospheric effects sensors 530.1.1 through 530.*x.y* can be dependent upon the location of the seats, rails, and/or walls within the venue 500 without departing from the spirit and scope of the present disclosure. Generally, a first row of atmospheric effect sensors from among the series of y columns of atmospheric effects sensors can coincide with a minimum range of the atmospheric effects provided by the atmospheric effects pod system 524 and $y^{th}$ column of atmospheric effect sensors from among the series of y columns of atmospheric effects sensors can coincide with a maximum range of the atmospheric effects provided by the atmospheric effects pod system 524.

In some embodiments, one or more rows of atmospheric effects sensors from among the series of x rows of atmospheric effects sensors can be associated with one or more seating sections 504.1 through 504.*d* of the seating levels 502.1 through 502.*d*. For example, the atmospheric effects sensors 530.1.1 through 530.*x*.*y* from among a first row of atmospheric effects sensors from among the series of x rows of atmospheric effects sensors, such as the atmospheric effects sensors 530.1.1 through 530.1.*y* to provide an example, can be associated with the seating section 504.*d* of the seating levels 502.1 through 502.*d* and/or atmospheric effects sensors 530.1.1 through 530.*x*.*y* from among a $x^{th}$ row of atmospheric effects sensors from among the series of x rows of atmospheric effects sensors, such as the atmospheric effects sensors 530.*x*.1 through 530.*x*.*y* to provide an example, can be associated with the seating section 504.1 of the seating levels 502.1 through 502.*d*. In this example, the first row of atmospheric effects sensors can be used to detect, or to measure, the one or more physical properties that are associated with the seating section 504.*d* of the seating levels 502.1 through 502.*d* and/or the $x^{th}$ row of atmospheric effects sensors can be used to detect, or to measure, the one or more physical properties that are associated with associated with the seating section 504.1 of the seating levels 502.1 through 502.*d*. In some embodiments, the first row of atmospheric effects sensors can be used to detect, or to measure, such as temperature, atmospheric pressure, humidity, wind speed, wind direction, precipitation amount, and scent to provide some examples, by audience members seated within the seating section 504.*d* of the seating levels 502.1 through 502.*d* and/or the $x^{th}$ row of atmospheric effects sensors can be used to detect, or to measure, such as temperature, atmospheric pressure, humidity, wind speed, wind direction, precipitation amount, and scent to provide some examples, by audience members seated within the seating section 504.1 of the seating levels 502.1 through 502.*d*.

In an exemplary embodiment, the atmospheric effects sensors 530.1.1 through 530.*x*.*y* can be arranged in a series of three (3) rows of atmospheric effects sensors and a series of three (3) columns of atmospheric effects sensors to form an array of nine (9) atmospheric effects sensors to detect, or to measure, the one or more physical properties in a substantially similar manner as described above. In this exemplary embodiment, a first row of atmospheric effects sensors from among series of three (3) rows of atmospheric effects sensors can be situated nearby the row of seats 506.1 from among the seating level 502.1, for example, approximately, eighty (80) feet from the atmospheric effects pod system 524, a second row from among series of three (3) rows of atmospheric effects sensors can be situated approximately halfway between the first row of atmospheric effects sensors and a third row from among series of three (3) rows of atmospheric effects sensors for example, approximately, one hundred fifty five (155) feet from the atmospheric effects pod system 524, and the third row of atmospheric effects sensors can be situated nearby the row of seats 506.*e* from among the seating level 502.*d*, for example, approximately, two hundred forty (240) feet from the atmospheric effects pod system 524. In this exemplary embodiment, the atmospheric effects sensors 530.1.1 through 530.*x*.*y* from among three (3) columns of atmospheric effects sensors can be equally spaced within the venue 500 with respect to one another.

As illustrated in FIG. 5B, the atmospheric effects sensors 532.1 through 532.*z* can be arranged anywhere within the venue 500 to detect, or to measure, the one or more physical properties in a substantially similar manner as described above. In the exemplary embodiment illustrated in FIG. 5B, the atmospheric effects sensors 532.1 through 532.*z* can be implemented as mobile electrical, mechanical, and/or electro-mechanical devices that can move, for example, about the venue 500. The atmospheric effects sensors 532.1 through 532.*z* can be implemented as standalone, or discrete, devices, and/or can be incorporated within or coupled to other electrical, mechanical, and/or electro-mechanical devices, such as wagons; motor vehicles; railed vehicles, watercraft; underwater vehicles; amphibious vehicles; aircraft, for example, unmanned aerial vehicles (UAVs), also referred to as drones to provide some examples. In some embodiments, the atmospheric effects sensors 532.1 through 532.*z* can be cable suspended within the venue 500 and can be maneuvered about the venue 500 by, for example, the atmospheric effects control system 522.

Figure 6:
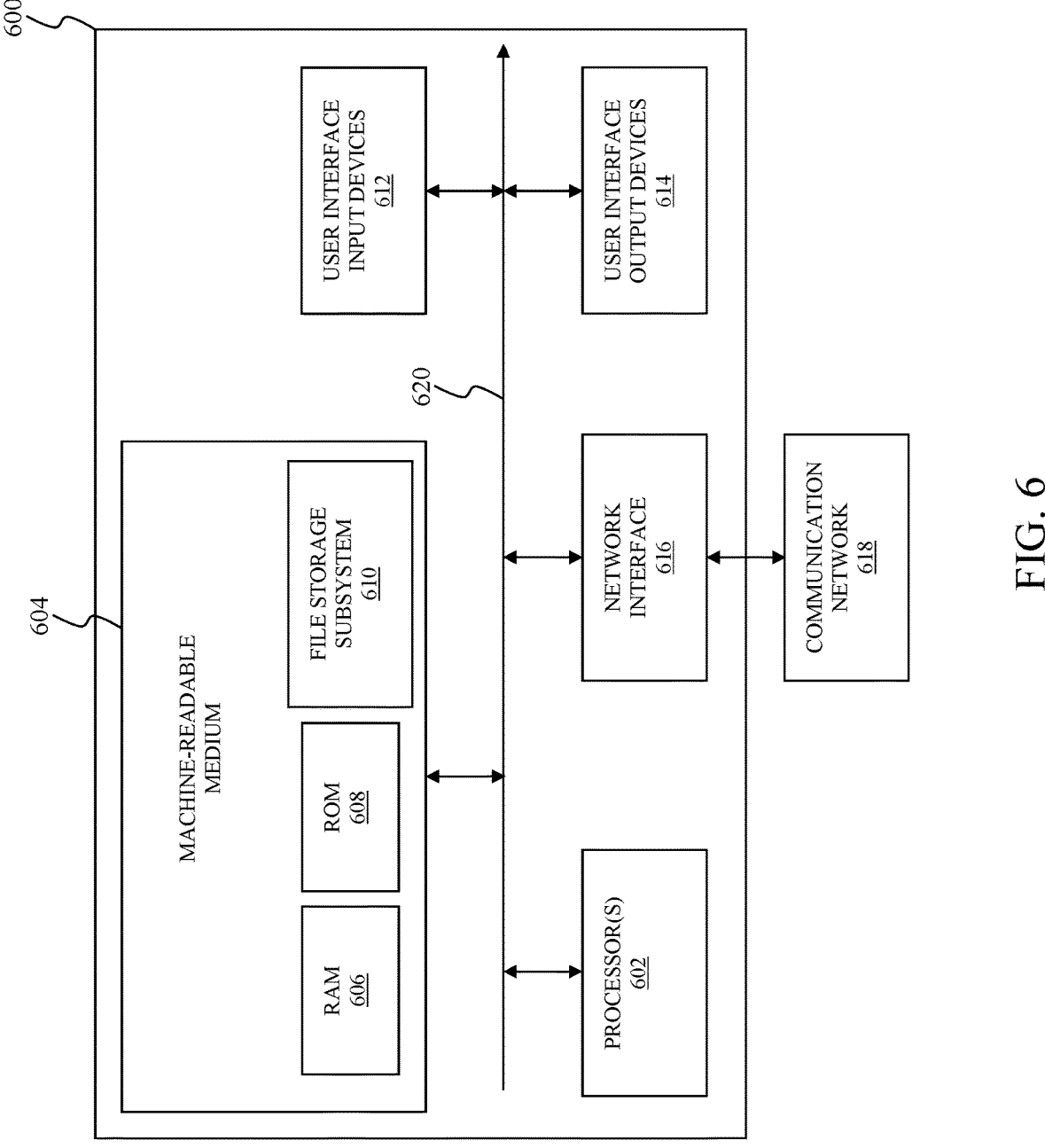
FIG. 6 graphically illustrates a simplified block diagram of a computing device that can be utilized to implement electronic devices within the exemplary venue according to some embodiments of the present disclosure.

Exemplary Atmospheric Effects Control System That Can Be Implemented Within the Exemplary Closed Loop Feedback Atmospheric Effects System FIG. 6 graphically illustrates a simplified block diagram of a computing device that can be utilized to implement electronic devices within the exemplary venue according to some embodiments of the present disclosure. The discussion of FIG. 6 to follow is to describe a computing device 600 that can be used to implement the atmospheric effects control system 102, the atmospheric effects control system 302, and/or the atmospheric effects control system 522 as described above.

In the embodiment illustrated in FIG. 6, the computing device 600 includes one or more processors 602. In some embodiments, the one or more processors 602 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a collection of processors available at a distributed or remote system, these processors accessible via a communications network (e.g., the Internet) and via one or more software interfaces (e.g., an application program interface (API).) In some embodiments, the computing device 600 can include an operating system, such as Microsoft's Windows, Sun Microsystems's Solaris, Apple Computer's MacOs, Linux or UNIX. In some embodiments, the computing device 600 can also include a Basic Input/Output System (BIOS) and processor firmware. The operating system, BIOS and firmware are used by the one or more processors 602 to control subsystems and interfaces coupled to the one or more processors 602. In some embodiments, the one or more processors 602 can include the Pentium and Itanium from Intel, the Opteron and Athlon from Advanced Micro Devices, and the ARM processor from ARM Holdings.

As illustrated in FIG. 6, the computing device 600 can include a machine-readable medium 604. In some embodiments, the machine-readable medium 604 can further include a main random-access memory ("RAM") 606, a read only memory ("ROM") 608, and/or a file storage subsystem 610. The RAM 730 can store instructions and data during program execution and the ROM 732 can store fixed instructions. The file storage subsystem 610 provides persistent storage for program and data files, and may include a hard disk drive, a floppy disk drive along with associated removable media, a CD-ROM drive, an optical drive, a flash memory, or removable media cartridges. The one or more processors 602 can access the machine-readable medium 604 to retrieve instructions stored in the machine-readable medium 604, which when executed by the one or more processors 602, can cause the one or more processors 602 to perform the corresponding function(s) associated with the one or more processors 602 as described above.

The computing device 600 can further include user interface input devices 612 and user interface output devices 614. The user interface input devices 612 can include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices to provide some examples. The user interface input devices 612 can be connected by wire or wirelessly to the computing device 600. Generally, the user interface input devices 612 are intended to include all possible types of devices and ways to input information into the computing device 600. The user interface input devices 612 typically allow a user to identify objects, icons, text and the like that appear on some types of user interface output devices, for example, a display subsystem. The user interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as an audio output or tactile output (e.g., vibrations) devices. Generally, the user interface output devices 620 are intended to include all possible types of devices and ways to output information from the computing device 600.

The computing device 600 can further include a network interface 616 to provide an interface to outside networks, including an interface to a communication network 618, and is coupled via the communication network 618 to corresponding interface devices in other computing devices or machines. The communication network 618 may comprise many interconnected computing devices, machines and communication links. These communication links may be wired links, optical links, wireless links, or any other devices for communication of information. The communication network 618 can be any suitable computer network, for example a wide area network such as the Internet, and/or a local area network such as Ethernet. The communication network 618 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

As illustrated in FIG. 6, the one or more processors 602, the machine-readable medium 604, the user interface input devices 612, the user interface output devices 614, and/or the network interface 616 can be communicatively coupled to one another using a bus subsystem 620. Although the bus subsystem 620 is shown schematically as a single bus, alternative embodiments of the bus subsystem may use busses.

CONCLUSION

The Detailed Description referred to accompanying figures to illustrate exemplary embodiments consistent with the disclosure. References in the disclosure to "an exemplary embodiment" or "exemplary embodiments" indicates that the exemplary embodiment(s) described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to be limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include nontransitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. An atmospheric effects system for presenting an atmospheric effect within a venue, the atmospheric effects system comprising:

an atmospheric effects pod system configured to provide the atmospheric effect within the venue without an audience being present in the venue;

an atmospheric effects monitoring system configured to measure and record a physical property of the atmospheric effect without the audience being present in the venue; and an atmospheric effects control system configured to:

compare the physical property of the atmospheric effect with a corresponding performance target from among a plurality of performance targets;

regulate a configuration of the atmospheric effects pod system until the physical property of the atmospheric effect satisfies the corresponding performance target to determine a plurality of configurations of the atmospheric effects pod system that respectively satisfy the plurality of performance targets, store the plurality of configurations of the atmospheric effects pod system that provided the atmospheric effect at the plurality of performance targets to generate a plurality of entries in an atmospheric effects calibration database, each entry from among the plurality of entries being associated with a corresponding configuration from among the plurality of configurations and a corresponding performance target from among the plurality of performance targets, access the atmospheric effects calibration database to retrieve a corresponding entry that achieves a specific performance target in the venue from among the plurality of entries in the atmospheric effects calibration database, and configure the atmospheric effects pod system in accordance with the corresponding entry to provide the atmospheric effect at the specific performance target within the venue during an event being hosted by the venue and with the audience being present in the venue.

2. The atmospheric effects system of claim 1, wherein the physical property of the atmospheric effect comprises a temperature, an atmospheric pressure, a humidity, a wind speed, a wind direction, a precipitation amount, or a scent.

3. The atmospheric effects system of claim 1, wherein the atmospheric effects monitoring system comprises an atmospheric effects sensor configured to measure the physical property of the atmospheric effect at a location within the venue.

4. The atmospheric effects system of claim 3, wherein the atmospheric effects sensor comprises:

a stationary device that is incorporated within or coupled to the venue; or a mobile device that moves about the venue.

5. The atmospheric effects system of claim 1, wherein the corresponding performance target is outlined by event information relating to the event.

6. The atmospheric effects system of claim 1, wherein the atmospheric effects calibration database outlines the plurality of configurations for the atmospheric effects pod system to provide the atmospheric effect at the plurality of performance targets within the venue.

7. The atmospheric effects system of claim 1, wherein the atmospheric effects control system is configured to:

vary the configuration of the atmospheric effects pod system when a difference between the corresponding performance target and the physical property of the atmospheric effect is outside of a target window; and maintain and store the configuration of the atmospheric effects pod system when the difference between the corresponding performance target and the physical property of the atmospheric effect is within the target window.

8. A venue for presenting an atmospheric effect in relation to an event, the venue comprising:

an atmospheric effects pod system configured to provide the atmospheric effect within the venue without an audience being present in the venue;

an atmospheric effects monitoring system configured to measure and record a plurality of physical properties of the atmospheric effect at a plurality of locations within the venue without the audience being present in the venue; and an atmospheric effects control system configured to:

compare the plurality of physical properties of the atmospheric effect with corresponding performance targets from among a plurality of performance targets, regulate a configuration of the atmospheric effect pod system until the plurality of physical properties of the atmospheric effect satisfy the corresponding performance targets to determine a plurality of configurations of the atmospheric effects pod system that respectively satisfy the plurality of performance targets, store the plurality of configurations of the atmospheric effects pod system that provided the atmospheric effect at the plurality of performance targets to generate a plurality of entries in an atmospheric effects calibration database, each entry from among the plurality of entries being associated with a corresponding configuration from among the plurality of configurations and corresponding performance targets from among the plurality of performance targets, access the atmospheric effects calibration database to retrieve a corresponding entry that achieves a plurality of specific performance targets at the plurality of locations from among the plurality of entries in the atmospheric effects calibration database, and configure the atmospheric effects pod system in accordance with the corresponding entry to provide the atmospheric effect at the plurality of specific performance targets at the plurality of locations during an event being hosted by the venue and with the audience being present in the venue.

9. The atmospheric effects system of claim 1, wherein the atmospheric effects control system is configured to:

regulate an atmospheric effects control signal to cause the atmospheric effects pod system to provide the atmospheric effect at the physical property until satisfying the corresponding performance target to determine a plurality of atmospheric effects control signals for the atmospheric effects pod system that respectively satisfy the plurality of performance targets, and store the plurality of atmospheric effects control signals that provided the atmospheric effect at the plurality of performance targets to generate the plurality of entries in the atmospheric effects calibration database.

10. The atmospheric effects system of claim 1, wherein the atmospheric effects control system is further configured to:

receive an environmental measurement from the atmospheric effects monitoring system that indicates the physical property of the atmospheric effect, and process the environmental measurement to determine the physical property of the atmospheric effect.

11. The atmospheric effects system of claim 10, wherein the atmospheric effects control system is configured to smooth the environmental measurement to determine the physical property of the atmospheric effect.

12. The venue of claim 8, wherein the plurality of physical properties of the atmospheric effect comprise one or more temperatures, atmospheric pressures, humidity, wind speeds, wind directions, precipitation amounts, or scents of the atmospheric effect at the plurality of locations.

13. The venue of claim 8, wherein the atmospheric effects monitoring system comprises:

a plurality of atmospheric effects sensors configured to measure the plurality of physical properties of the atmospheric effect at the plurality of locations.

14. The venue of claim 13, wherein at least one atmospheric effect sensor from among the plurality of atmospheric effects sensors comprises:

a stationary device that is incorporated within or coupled to the venue; or a mobile device that moves about the venue.

15. The venue of claim 8, wherein the corresponding performance targets are outlined by event information relating to the event.

16. The venue of claim 8, wherein the atmospheric effects calibration database outlines the plurality of configurations for the atmospheric effects pod system to provide the plurality of atmospheric effects at the plurality of performance targets.

17. The venue of claim 8, wherein the atmospheric effects control system is configured to:

vary the configuration of the atmospheric effect system when a difference between the corresponding performance targets and the plurality of physical properties of the plurality of atmospheric effects is outside of a target window; and maintain and store the configuration of the atmospheric effect system when the difference between the corresponding performance targets and the plurality of physical properties of the plurality of atmospheric effects is within the target window.

18. A method for operating an atmospheric effects system for presenting an atmospheric effect within a venue, the method comprising:

providing, by the atmospheric effects system, the atmospheric effect within the venue without an audience being present in the venue;

measuring and recording, by the atmospheric effects system, a physical property of the atmospheric effect without the audience being present in the venue;

comparing, by the atmospheric effects system, the physical property of the atmospheric effect with a corresponding performance target from among a plurality of performance targets;

regulating, by the atmospheric effects system, a configuration of the atmospheric effects system until the physical property of the atmospheric effect satisfies the corresponding performance target to determine a plurality of configurations of the atmospheric effects pod system that respectively satisfy the plurality of performance targets;

storing, by the atmospheric effects system, the plurality of configurations of the atmospheric effects system that provided the atmospheric effect at the plurality of performance targets to generate a plurality of entries in an atmospheric effects calibration database, each entry from among the plurality of entries being associated with a corresponding configuration from among the plurality of configurations and a corresponding performance target from among the plurality of performance targets;

accessing, by the atmospheric effects system, the atmospheric effects calibration database to retrieve a corresponding entry that achieves a specific performance target in the venue from among the plurality of entries in the atmospheric effects calibration database; and configuring, by the atmospheric effects system, the atmospheric effects system in accordance with the corresponding entry to provide the atmospheric effect at the specific performance target within the venue during an event being hosted by the venue and with the audience being present in the venue.

19. The method of claim 18, wherein the physical property of the atmospheric effect comprises a temperature, an atmospheric pressure, a humidity, a wind speed, a wind direction, a precipitation amount, or a scent.

20. The method of claim 18, wherein the measuring and recording comprises:

measuring and recording the physical properties property of the atmospheric effect at a location within the venue.

21. The method of claim 18, wherein the corresponding performance target is outlined by event information relating to the event.

22. The method of claim 21, wherein the atmospheric effects calibration database outlines the plurality of configurations for the atmospheric effects pod system to provide the plurality of atmospheric effects at the plurality of performance targets within the venue.

23. The method of claim 18, wherein regulating comprises:

varying, by the atmospheric effects system, the configuration of the atmospheric effects system when a difference between the corresponding performance target and the physical property of the atmospheric effect is outside of a target window; and maintaining, by the atmospheric effects system, the configuration of the atmospheric effects system when the difference between the corresponding performance target and the physical property of the atmospheric effect is within the target window, and wherein the storing comprises:

storing, by the atmospheric effects system, the configuration of the atmospheric effects system when the difference between the corresponding performance target and the physical property of the atmospheric effect is within the target window.

* * * * *